J. HARRIGAN.
MANURE RECEIVING ATTACHMENT.
APPLICATION FILED DEC. 2, 1907.
909,998.
Patented Jan. 19, 1909.
2 SHEETS—SHEET 1.
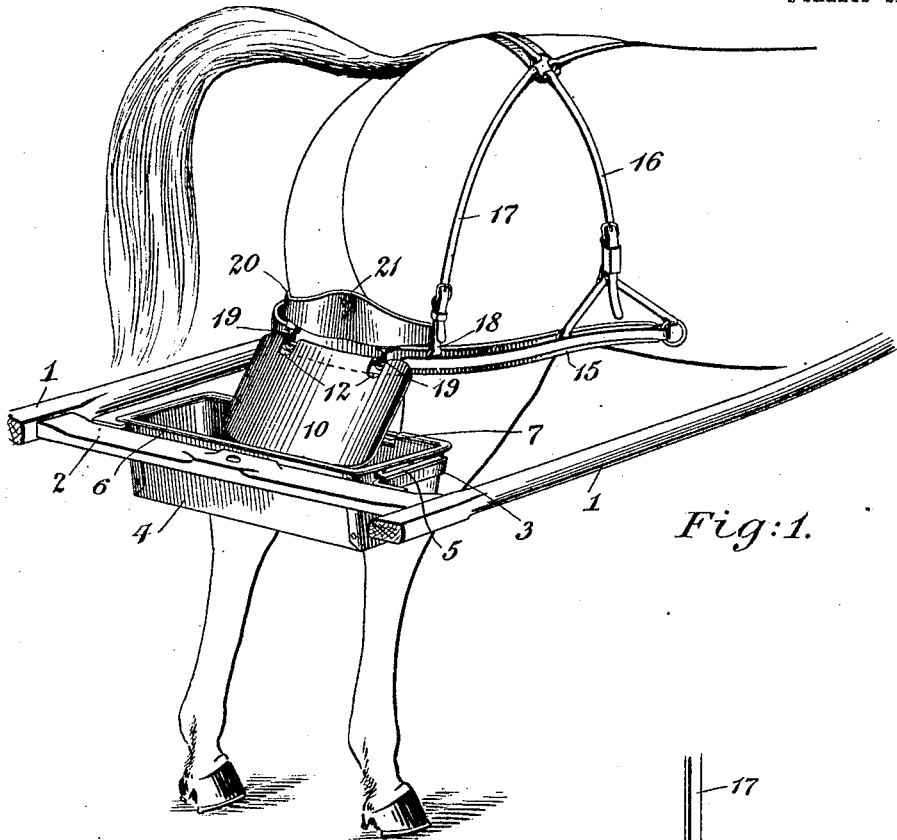
Fig:1.
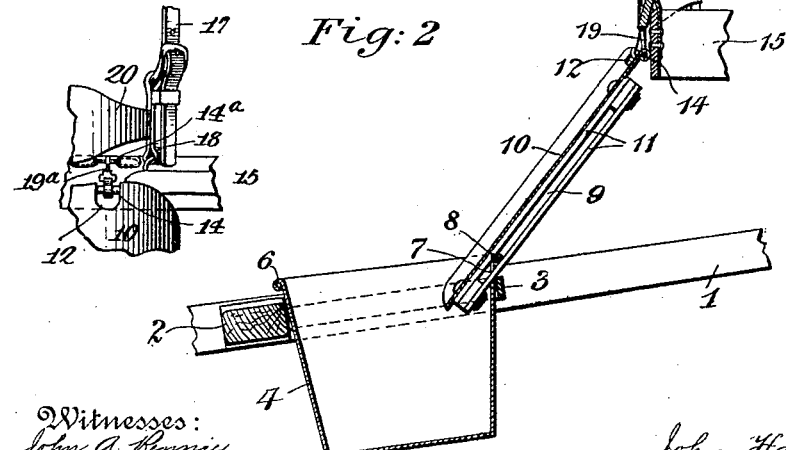
Fig:5. Fig:2.
Witnesses:
John A. Rennie
P. Margulies
Inventor
John Harrigan
By his Attorney J. HARRIGAN.
MANURE RECEIVING ATTACHMENT.
APPLICATION FILED DEC. 2, 1907.
909,998.
Patented Jan. 19, 1909.
2 SHEETS—SHEET 2.
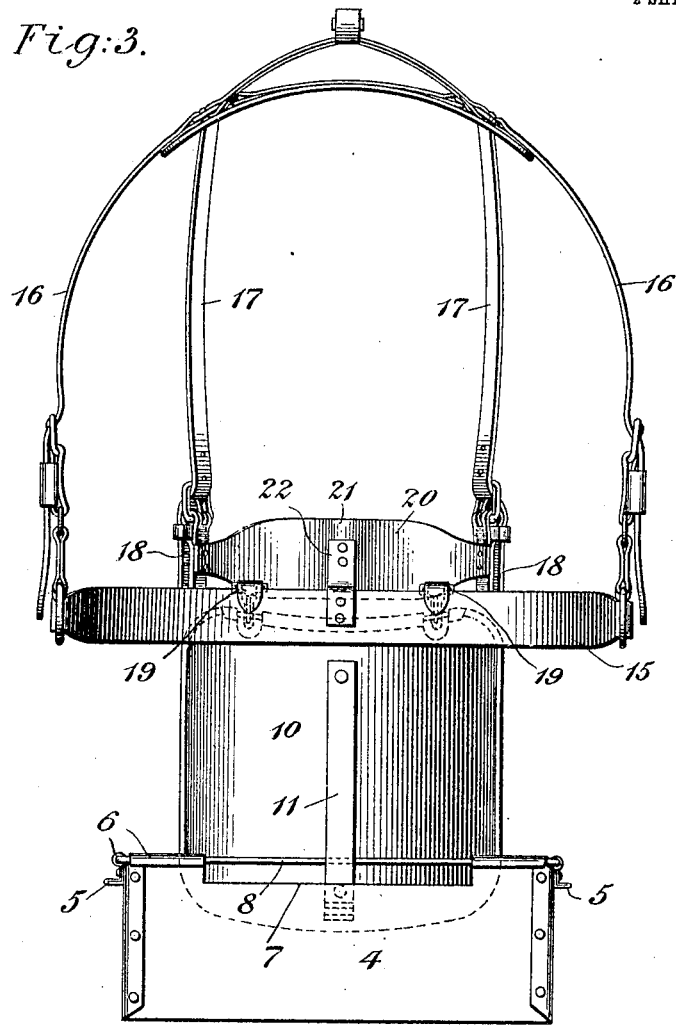
Fig: 3.
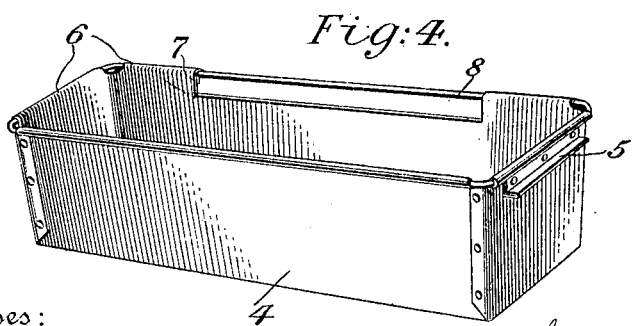
Fig: 4.
Witnesses:
John A. Rennie
P. Margulies.
Inventor
John Harrigan
By his Attorney

UNITED STATES PATENT OFFICE.

JOHN HARRIGAN, OF BROOKLYN, NEW YORK.

MANURE-RECEIVING ATTACHMENT.

No. 909,998.  Specification of Letters Patent.  Patented Jan. 19, 1909.

Application filed December 2, 1907. Serial No. 404,713.

*To all whom it may concern:*

Be it known that I, JOHN HARRIGAN, a citizen of the United States, residing in the borough of Brooklyn, Kings county, New York, have invented certain new and useful Improvements in Manure - Receiving Attachments, of which the following is a specification.

This invention relates to certain improvements in that class of devices which are especially designed and adapted for application to vehicles for receiving manure, so that the same is prevented from being dropped upon the street or roadway, and the object of the invention is to provide a device of this character of a simple and comparatively inexpensive nature which shall not present an unsightly appearance and which shall be adapted to accommodate itself to the movement of the draft animal without liability of frightening or chafing the animal.

The invention consists in certain novel features of the construction and combinations and arrangements of the several parts of the improved manure receiving device, whereby certain important advantages are attained, and the device is rendered simpler, cheaper and otherwise better adapted and more convenient for use, all as will be hereinafter fully set forth.

The novel features of the invention will be carefully defined in the claims.

In the accompanying drawings which serve to illustrate the invention—Figure 1 is a perspective view showing my improvements applied in position for use; Fig. 2 is a sectional view taken vertically and centrally through the device; Fig. 3 is a front elevation of the device with its several parts adjusted in position for use; Fig. 4 is a perspective view of the can or receptacle for receiving the manure; and Fig. 5 is a fragmentary detail view showing a modified form of the connection of the chute-member with the breeching.

In these views 1 represents the thills of a vehicle and 2 the cross-piece connecting the same and whereon the whiffle tree is commonly carried, and 3 represents a metal bar the ends of which are secured upon the cross-piece 2 while its central portion is bent or directed forwardly and horizontally from said cross-piece, being spaced apart therefrom to an extent to snugly receive within the supporting frame thus provided, a receptacle 4 which, as herein shown is of a rectangular form and which is adapted to receive the droppings of the draft animal.

The can or receptacle 4 is preferably made slightly tapered at its sides, as clearly shown in the drawings, so as to be adapted to be readily lifted from the supporting frame when desired for emptying or cleansing while being adapted to fit snugly and without rattling in said frame when in position for use, so as to avoid liability of startling the draft animal or attracting the attention of persons to the improved attachment, and the ends of said can or receptacle are provided at their upper parts, with outwardly directed flanges or projections 5, which are adapted, when the can or receptacle is positioned in the supporting frame, as shown in Figs. 1 and 2, to rest upon the ends of the said frame to effectively support the can or receptacle.

The can or receptacle has its upper edge portions reinforced, as shown at 6, preferably by wiring said edges, and the front wall of said can or receptacle has its upper edge portion cut away as shown at 7, whereby the wire or reinforce is exposed, as seen at 8, and is thereby adapted to be passed through and engaged with a guide way 9, centrally and longitudinally extended along the underside of a chute member 10, formed of a metal plate held, during the use of the device in an inclined position as shown in Figs. 1 and 2, with its forward end elevated, and connected, as will be hereinafter described, with the harness of the draft animal in position to receive the droppings while its lower rear end is adjustably connected, by means of the guide way 9 and guide strip 8, with the forward part of the can or receptacle 3 in position to deliver such droppings into said can or receptacle.

As herein shown, the guide way 9 is produced between spaced strips 11, 11 secured upon the underside of the chute member 10, and said strips 11, 11, are preferably formed of wood or the like to avoid the production of noise or rattling during movement of the animal, the uppermost strip 11 serving to support the chute member 10 out of contact with the can or receptacle and with its rear end projecting within or overhanging the receptacle to insure the proper delivery of the droppings thereto.

The opening 7 at the front wall of the can or receptacle is of such width as to afford a considerable exposure of the wire at 8, so as to permit free lateral movement of the rear end of the chute member relatively to the plate without binding of the parts, so as to accommodate itself freely to the movement of the draft animal, and the length of the guide way 9 is such as to afford a sliding adjustable connection of the chute member with the can or receptacle to further accommodate the movement of the animal, the rear end of the chute member playing in and out of the can or receptacle during such movement, as will be readily understood.

The upper side of the chute member is given a trough like form, its lateral edge portions being directed above its central part to prevent the droppings from moving laterally and falling from said member to the roadway and also to prevent rattling and noise due to contact of said lateral edge portions of the member with the can or receptacle, the centrally arranged upper strip 11 acting in connection with said upwardly directed edge portions, to effectively prevent such contact of the parts during the use of the device.

By preference the edge portions of the chute member 10 are reinforced as shown in the drawings, and at the upper part of said member such reinforcement is in the form of a wired edge, there being spaced apertures 12, 12 produced at opposite sides of said upper edge portion, at which apertures the wire reinforce is exposed as shown at 14, 14, so as to be adapted for detachable engagement with fastening devices connected with the harness as I will now describe.

15 represents the breeching, supported by the breeching straps 16, 16 at its forward part, and having additional support by means of the auxiliary straps 17, 17, which are adapted to be passed down behind the buttocks of the animal and the lower ends of which have adjustable connection as shown at 18 with short straps secured to the rear part of the breeching.

19, 19 are snap hooks or similar fastenings, carried by the breeching adjacent to the connections of the auxiliary straps 17, therewith, and said snap hooks are adapted for detachable connection at the apertures 12, 12 with the exposed portions 14, 14, of the reinforce wire at the upper edge of the chute member in such a way as to afford a secure pivotal connection of the chute member with the harness, such as is necessary to permit said member to accommodate itself to the movements of the animal, while, at the same time, said chute member is adapted to be readily disconnected from the breeching to permit emptying and cleansing of the can or receptacle with which said member is connected.

It is evident that other forms of fastening may be substituted at will for the snap hooks 19, 19, and said snap hooks or equivalent fastenings are so arranged that the forward upper edge of the inclined chute member is adapted for contact against the breeching 15 and is thereby prevented from striking upon or chafing the draft animal in any way.

20 represents a guard strip or member preferably formed from leather and arranged across the buttocks of the draft animal above the breeching, being connected at its ends with the short straps 18 at the lower ends of the auxiliary buttock straps 17 in such a way as to form substantially a part of the harness. The central part 21 of this guard strip or member is connected with and supported by a forwardly directed bracket 22 secured at the central part of the breeching, whereby said central part 21 of the guard strip or member is caused to extend in a forwardly inclined direction as shown in Fig. 1, between the buttocks of the draft animal, in position to prevent the falling or lodgment of droppings in front of or upon the breeching, the droppings being guided by said strip or member 20 down upon the chute member for delivery into the can or receptacle 3.

The device constructed according to my invention is of an extremely simple and comparatively inexpensive nature and is particularly well adapted for use by reason of its adjustability which permits of accommodating the various movements of the draft animal without liability of startling the animal or attracting undue attention from passers-by, and it will also be obvious from the above description of my improvements that the device is susceptible of some modification without material departure from the principles and spirit of the invention and for this reason I do not desire to be understood as limiting myself to the precise form and arrangement of the several parts of the device as herein set forth in carrying out my invention in practice. Nor do I desire to be understood as limiting myself to the employment of my improvements with any particular style or type of vehicle, since it is evident that this forms no part of the present invention. For example in some cases, the modified formation shown in Fig. 5 may be employed. As shown in this view, the snap hooks 19$^a$ are carried by the chute number 10 and are adapted to be detachably engaged with leather straps 14$^a$ carried by the breeching so that rattling caused by the chafing of the snap hooks 19 upon the wire 14 in the previous construction may be dispensed with.

Having thus described my invention, what I claim and desire to secure by Letters Patent is:—

1. A device of the character described comprising a receptacle adapted to be supported behind a draft animal, a chute member the forward end of which has means for connection with the harness of said animal and is extended in an inclined direction in position to receive droppings, while the rear end of said member is adapted to overhang the receptacle to deliver said droppings thereto, and a connection between the receptacle and said chute member and adapted to permit lateral movement of the rear end of the chute member relative to said receptacle.

2. A device of the character described comprising a receptacle adapted to be supported behind a draft animal, a chute member the forward end of which has means for connection with the harness of said animal and is extended in an inclined direction in position to receive droppings, while the rear end of said member is adapted to overhang said receptacle, to deliver said droppings thereto and a guide member extended along the receptacle in a direction transverse to the chute member, the said rear end of the chute member having at its underside means adapted for sliding engagement along said guide member to permit said end of the chute member to play laterally with relation to said receptacle in unison with the movements of the animal.

3. A device of the character described comprising a receptacle adapted to be supported behind a draft animal, a rigid chute member the forward end of which has detachable means for connection with the harness of said animal and is extended in an inclined direction in position to receive droppings, while the rear end of said member is adapted to overhang the receptacle to deliver said droppings thereto, and a connection between the receptacle and said chute member and adapted to permit lateral movement of the rear end of the chute member relative to the receptacle in unison with the movements of the draft animal.

4. A device of the character described comprising a receptacle adapted to be supported behind a draft animal, a chute member the forward end of which has means for connection with the harness of said animal and is extended in an inclined direction in position to receive droppings, while the rear end of said chute member is arranged to overhang said receptacle in position to deliver said droppings thereto, and a guide strip extended lengthwise upon the underside of the chute member and having sliding engagement with the receptacle and adapted to hold the rear end of said chute member out of contact with the receptacle.

5. A device of the character described comprising a receptacle adapted to be supported behind a draft animal, a chute member the forward end of which has means for connection with the harness of said animal and is extended in an inclined direction in position to receive droppings, while the rear end of said member is arranged to overhang the receptacle in position to deliver said droppings to said receptacle and connecting means for holding the receptacle and member in relation and permitting lateral and longitudinal movement of the member relatively to the receptacle.

6. A device of the character described comprising a receptacle adapted to be supported behind a draft animal, a chute member the forward end of which has means for connection with the harness of said animal and is extended in an inclined direction in position to receive said droppings, while the rear end of said member is arranged to overhang the receptacle in position to deliver said droppings to said receptacle and a connection between the receptacle and said member and comprising spaced strips extended lengthwise of said member and a part carried by said receptacle and engaged between said strips.

7. A device of the character described comprising a receptacle adapted to be supported behind a draft animal a chute member the forward end of which has means for connection with the harness of said animal and is extended in position to receive droppings, while the rear end of said member is arranged to overhang the receptacle in position to deliver said droppings to said receptacle and a connection between the receptacle and said member and comprising a guiding device extended transversely of the receptacle and a part carried by the member and engaged with said guiding device to permit lateral movement of said member relatively to the receptacle.

8. A device of the character described comprising a receptacle adapted to be supported behind a draft animal and having a guide member extended transversely across its upper part, a chute member formed of a piece of flat metal having raised side portions and having its forward end provided with means for connection with the harness of said animal and extended in an inclined direction in position to receive droppings, and a guide strip extended lengthwise along the underside of said chute member and spaced below the same to produce a guide way through which the transversely extended guide member of the receptacle is passed to retain the rear end of the said chute member in position above and overhanging said receptacle to deliver the droppings thereto.

9. A device of the character described comprising an open frame adapted to be connected with a vehicle behind a draft animal, a receptacle insertible in said frame and having its walls flared at their upper parts to fit snugly within the frame, a chute member having its forward end provided with means for connection with the harness of the draft animal and extended in an inclined direction in position to receive droppings, while its rear end is arranged to overhang the receptacle in position to deliver said droppings thereto, and a connection between the receptacle and the chute member and comprising a guiding device extending transversely of the receptacle and a part carried by the chute member and engaged with said guiding device to permit lateral movement of said member relatively to the receptacle.

10. A device of the character described comprising a receptacle adapted to be supported behind a draft animal, a breeching strap, a chute member having its forward end provided with means for connection with the breeching and extended in an inclined direction in position to receive droppings, while its rear end is arranged to overhang the receptacle in position to deliver the droppings thereto, a flexible guard member extended above the breeching strap and having a central forwardly directed portion adapted to be extended between the buttocks of the animal, and auxiliary buttock straps adapted to be extended down behind the buttocks of the animal and having their lower ends connected with the breeching and with opposite ends of said guard member.

In witness whereof I have hereunto signed my name in the presence of two subscribing witnesses.

JOHN HARRIGAN.

Witnesses:
   J. L. CAPLINGER,
   ALAN F. CONNELL.